Patented Feb. 13, 1940

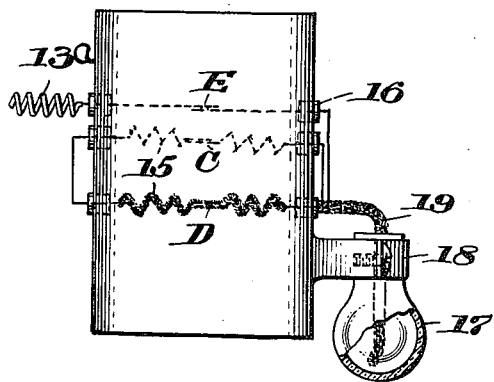
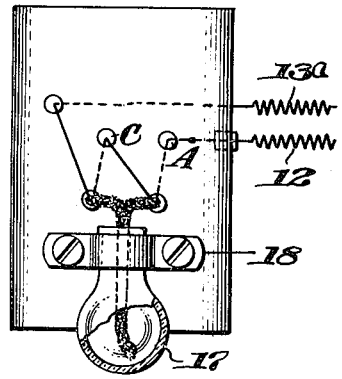
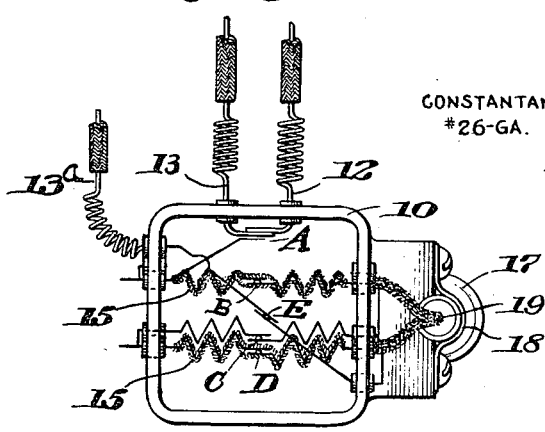
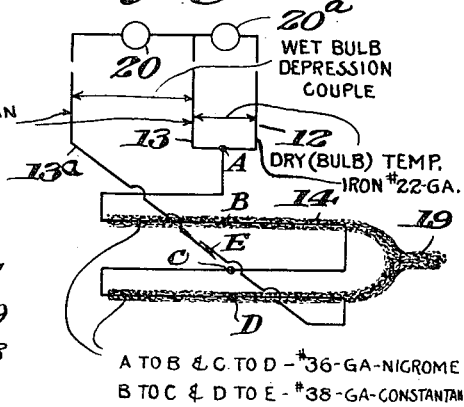

2,189,855

UNITED STATES PATENT OFFICE 2,189,855

APPARATUS FOR MEASURING HUMIDITY

Ralph M. Buffington and Gerald K. Ashby, Evansville, Ind., assignors to Servel, Inc., New York, N. Y., a corporation of Delaware Application April 26, 1937, Serial No. 139,076

5 Claims. (Cl. 73—338)

This invention relates broadly to apparatus for measuring humidity and is particularly concerned with a novel and improved thermocouple construction for use with hygrometers which operate on the psychrometric principle.

Under certain conditions it is extremely difficult if not impossible to obtain a correct or even approximately correct measurement of humidity. An example of such a condition is in domestic refrigerator cabinets wherein the air is nearly motionless or static. The practical testing of such cabinets calls for an instrument which is sensitive and reliable and relatively rapid in operation so as to be capable of giving a substantially continuous record.

It is an object of the present invention to provide a thermocouple psychrometer which is sensitive, reliable and rapid in operation, particularly under conditions such as those just noted. More specifically, the invention contemplates an improved thermocouple construction wherein wet bulb equilibrium is attained at low air velocity and errors due to conduction between the wet and dry junction is minimized, and wherein also errors due to radiation from surfaces of widely different temperatures with respect to the required dry bulb temperautre are reduced to a minimum.

The foregoing and other objects and advantages are attained by certain novel features of construction and arrangement of the several parts of the thermocouple apparatus which will become apparent in view of the following description taken in conjunction with the drawing, wherein:

Fig. 1 is a view in side elevation of a psychrometer constructed in accordance with the features of the present invention;

Fig. 2 is a view in front elevation of Fig. 1;

Fig. 3 is a view in plan;

Fig. 4 is a wiring diagram; and,

Fig. 5 is an enlarged fragmentary detail view of a wet junction.

A theoretical analysis shows that wet and dry bulb thermocouples require less air velocity the smaller the diameter of the wet element, since a small volume of air is required to reach adiabatic saturation in order to hold the wet element at true wet bulb temperature. The present invention is a practical application of this theory.

Referring to the drawing in detail, a housing or frame for the thermocouple apparatus is generally indicated at 10. In its preferred construction, the opposite ends of this housing are open and the sides closed. This housing or frame acts as a radiation shield, and may be constructed of Bakelite, covered with aluminum foil or otherwise designed to further reduce radiation and errors resulting therefrom.

The thermocouple wires are installed in the frame 10 and come in from opposite directions in substantially a straight line, note particularly Figs. 1 and 3, the elements being lined up across the housing or frame so that air passing through the housing strikes the wires at about a ninety degree angle. The dry junctions are indicated at A and C and the wet junctions at B and D. The wires from A to B and C to D are preferably of relatively small diameter and comprised of a high resistance alloy, such for example as #36 gauge nicrome, and the wires from B to C and D to E may be and preferably are of #38 gauge constantan, E being the point at which the wet bulb depression couple is connected to one of its exterior leads or conductors.

The preferred manner in which the wet junctions are made is illustrated in detail in Fig. 5, wherein the meeting ends of the wire are shown coiled around one another, the joint being made mechanically and electrically sound by silver solder, as indicated at 11. This arrangement also provides a minimum increase in diameter of the wires at the junction. The common lead, 13, of the dry bulb and wet bulb depression couples, may be and preferably is of #26 gauge constantan. The other lead of the wet bulb depression couple, 13a, should be of the same material as 13, and preferably is of the same gauge. The other dry bulb wire, 12, may be and preferably is, of #22 gauge iron. (Brown and Sharpe gauge). It will thus be seen that small diameter wire is used to attain wet bulb equilibrium at very low air velocity, and large diameter wire is used elsewhere in order to reduce electrical resistance.

The wires in the region of the wet junctions are provided with relatively thin wicking, as at 14, note particularly Figs. 4 and 5, which is preferably spun on the wire from absorbent cotton or the like. This thin wicking is used on the wet junctions and for a distance of about one and one-half or two inches on opposite sides thereof. In this manner, the junction itself and a substantial length of wire on each side thereof is kept wet and at the same time the diameter is held to a minimum.

To provide extra length of wire subject to air currents, the wire is coiled on opposite sides of the junctions, as at 15.

The opposite terminals of the thermocouple wires are suitably anchored in insulators 16. The water container or bulb is indicated at 17 and is shown mounted in a bracket 18 secured to the front wall of the housing 10. A wick 19 of absorbent cotton or the like extends into the bulb 17 and forms a continuous connection or moisture conducting path with the relatively thin wicking on the thermocouple wires. The wicking 19 may be and preferably is relatively large so that a generous supply of moisture is always available to the wicking 14.

The individual thermocouple elements within the housing 10 are preferably staggered so that even if backward circulation of air does ensue, air which has been in contact with a wet junction does not pass over a dry junction. Preferably, air circulation is from dry to wet junction. As will be understood, the housing or casing 10 is adapted to be disposed in a refrigerator or other compartment wherein the humidity measurement test is to be conducted.

Suitable indicating instruments in the measuring circuit, such as potentiometers, are indicated at 20 and 20a.

From the foregoing description, it will be noted that error due to conduction between the wet and dry junctions is minimized by the use of small diameter wires of relatively high resistance alloys; the introduction of an extra length of wire and the provision of relatively long wet sections. The junctions are connected in a manner to insure a good electrical connection and a mechanically sound joint with a minimum increase in diameter in providing such joint. While small wires and wicks are desirable insofar as the attainment of true wet bulb temperatures is concerned, yet there are practical limits which cannot be neglected, such as the mechanical strength of the wire and the maximum external electrical resistance permissible with suitable electrical indicating instruments, such as potentiometers and galvanometers in the measuring circuit. The radiation factor is taken into account by shielding the junctions as much as possible through the medium of the housing or frame 10. The use of small diameter wires and wicks also reduces the amount of evaporation to a point that the consequent increase in humidity of the cabinet is negligible, five cubic centimeters of water lasting twenty-four hours under normal operating conditions.

Actual tests have shown that an instrument constructed in accordance with this invention is sensitive to between one and two grains of moisture per pound of dry air, and further, that the instrument responds rapidly to changes in both wet and dry bulb temperatures. A comparison with known standard instruments shows that the reliability of the readings is high, and a comparison of the improved psychrometers with one another show that the readings agree. For example a comparison has been made between psychrometers constructed in accordance with the present invention and a standard wet and dry bulb psychrometer utilizing a fan, the tests being made in the center of a closed carton one foot high and with the standard psychrometer in open air outside the carton.

It will be understood that the drawing as well as the foregoing description constitutes an exemplary illustration of the invention, and that certain changes in construction and design may be adopted within the scope of the invention as defined by the appended claims.

We claim:

1. In a thermoelectric hygrometer, a casing of thermal insulation open for passage of air therethrough, a thermocouple formed by two thin wires extending into and joined together within said casing, wick material around said joint to keep the joint wet, said wires within the casing extending substantially perpendicular to the direction of air flow through the casing, all parts of said wires within said casing being in the path of air flow therethrough.

2. A thermoelectric hygrometer as set forth in claim 1 in which said wick material is around said joint and also around said wires for a substantial distance on each side of said joint.

3. A thermoelectric hygrometer as set forth in claim 1 in which said wick material is also around said wires a substantial distance on each side of said joint, and said wick material is thinner within the region of said joint than that around the wires on each side of the joint beyond said region.

4. A thermoelectric hygrometer as set forth in claim 1 in which the length of wire in contact with air within said casing is increased by making said wires on each side of said joint in the form of a zig-zag or coil.

5. In a thermoelectric hygrometer, a casing of thermal insulation open for passage of air therethrough, a thermocouple including two relatively thin wires extending into the casing substantially perpendicular to the flow of air therethrough and joined together at their meeting extremities, and a relatively thin sheath of capillary material covering the joint and a substantial length of wire on each side of the joint within the casing.

RALPH M. BUFFINGTON.
GERALD K. ASHBY.